US009351172B2

(12) United States Patent
Thiel et al.

(10) Patent No.: US 9,351,172 B2
(45) Date of Patent: May 24, 2016

(54) TECHNIQUES FOR ESTIMATING A COVERAGE AREA FOR A DISTRIBUTED ANTENNA SYSTEM (DAS) OR A REPEATER SYSTEM

(71) Applicant: Viavi Solutions UK Limited, Newbury (GB)

(72) Inventors: Stefan Ulrich Thiel, Newbury (GB); Mihai Stanciuc, Newbury (GB); Howard John Thomas, Middleyard (GB); Peter Kenington, Devauden (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/448,073

(22) Filed: Jul. 31, 2014

(65) Prior Publication Data

US 2016/0037355 A1 Feb. 4, 2016

(51) Int. Cl.
| | |
|---|---|
| H04W 16/22 | (2009.01) |
| H04W 16/18 | (2009.01) |
| H04W 64/00 | (2009.01) |
| H04B 7/155 | (2006.01) |
| H04W 16/26 | (2009.01) |
| H04W 56/00 | (2009.01) |
| H04W 88/08 | (2009.01) |

(52) U.S. Cl.
CPC ............ H04W 16/18 (2013.01); H04B 7/15507 (2013.01); H04W 16/26 (2013.01); H04W 56/004 (2013.01); H04W 64/003 (2013.01); H04W 88/085 (2013.01)

(58) Field of Classification Search
CPC . H04W 47/0833; H04W 72/02; H04W 84/06; H04W 28/06; H04B 7/18506; H04B 7/0456
USPC ........ 455/446, 513; 370/241.1, 254, 336, 329
See application file for complete search history.

(56) References Cited

U.S. PATENT DOCUMENTS

| 8,374,596 B2 | 2/2013 | Thiel et al. |
| 2009/0131078 A1 | 5/2009 | Yang |

(Continued)

FOREIGN PATENT DOCUMENTS

WO 2004/080105 A2 9/2004

OTHER PUBLICATIONS

Extended European Search Report corresponding to EP Application No. 15 17 9133, mailed Dec. 16, 2015, 8 pages.

*Primary Examiner* — Phuoc H Doan
(74) *Attorney, Agent, or Firm* — Harrity & Harrity, LLP (57) ABSTRACT

Techniques for estimating a coverage area for a distributed antenna system (DAS) or a repeater system are disclosed. In one particular exemplary embodiment, the techniques may be realized as a system for estimating a coverage area for a distributed antenna system (DAS) or a repeater system. The system may comprise one or more processors communicatively coupled to a mobile communications network. The one or more processors may be configured to identify a sector as being a base station sector that deploys a distributed antenna system (DAS) or a repeater system. The one or more processors may also be configured to determine an approximate location for one or more antennas deployed by the distributed antenna system (DAS) or the repeater system. The one or more processors may further be configured to construct an estimated coverage area for the base station sector that deploys the distributed antenna system (DAS) or the repeater system.

25 Claims, 6 Drawing Sheets

(56) References Cited

U.S. PATENT DOCUMENTS

| | | |
|---|---|---|
| 2009/0191891 A1 | 7/2009 | Ma et al. |
| 2011/0034122 A1 | 2/2011 | Kennedy, Jr. et al. |
| 2011/0222434 A1* | 9/2011 | Chen .............................. 370/254 |
| 2011/0319093 A1 | 12/2011 | Flanagan |
| 2013/0070612 A1* | 3/2013 | Timus et al. ............... 370/241.1 |
| 2013/0210449 A1 | 8/2013 | Flanagan |
| 2013/0210450 A1 | 8/2013 | Kenington et al. |
| 2014/0171102 A1 | 6/2014 | Murphy et al. |
| 2014/0171103 A1 | 6/2014 | Murphy et al. |

\* cited by examiner

TECHNIQUES FOR ESTIMATING A COVERAGE AREA FOR A DISTRIBUTED ANTENNA SYSTEM (DAS) OR A REPEATER SYSTEM

TECHNICAL FIELD

The present invention relates to geolocation of mobile devices within a wireless telecommunications system, and more particularly, to techniques for estimating a coverage area for a distributed antenna system (DAS) or a repeater system.

BACKGROUND

Mobile communication devices, such as smart phones, tablets, and other electronic hand-held devices, are becoming increasingly popular. Although mechanisms exist to locate mobile devices within a wireless telecommunications system, such mechanisms typically suffer a significant loss of accuracy, especially in networks served by a distributed antenna system (DAS) or a repeater system. A base station that deploys a DAS, for example, may use multiple antennas. Depending on how spread out they are relative to the base station and with each other, these antennas may distort or change the shape of a typical circular or a 120-degree sector coverage area of the base station. And without an accurate estimate of the coverage area, it becomes quite challenging to locate one or more mobile devices within that cell or sector using the DAS. In view of the foregoing, it may be understood that there are significant problems and shortcomings associated with current solutions and technologies for estimating a coverage area in wireless telecommunications systems that use a distributed antenna system (DAS) or repeater system.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

Exemplary embodiments may provide a system and method for estimating a coverage area for a distributed antenna system (DAS) or a repeater system. That is, exemplary embodiments may, among other things, improve coverage area estimates for DAS and repeater based cells to provide greater location accuracy of mobile devices used in these cells.

As described above, conventional mechanisms to locate mobile devices within wireless telecommunications systems typically suffer significant drawbacks. Although a mobile device equipped with a global positioning system (GPS) may provide location estimates, enabling a GPS receiver in a mobile device typically results in significant power drain on a mobile device's battery. Another technique involves examining base stations that are visible to a mobile device and calculating an intersection of coverage footprints of base stations based upon drive-testing or data collected from previous users of the same base stations. However, this process assumes that the mobile device is somewhere within the overlap of coverage areas and involves enabling the GPS receiver on the mobile devices, which were originally used to ascertain the coverage areas of the base stations. Still other techniques may take into account a timing delay between a user device and a number of local base stations. For instance, the time taken for signals to propagate to each base station may provide an estimate of the distance of the user device from each base station, and hence, combined information from a number of base stations may thereby provide a set of delay contours, whose intersection may provide an approximate location of the user device.

It should be appreciated that such techniques may work in a standard wireless environment, e.g., where a primary base station is directly connected to a backhaul system, which in turn connects to the OSS, and in which the base station's antennas (in the event that there is more than one) are all co-located with each other. However, when a network is served by a distributed antenna system (DAS) or a repeater system, such location mechanisms may suffer a significant loss in accuracy. This occurs because the location of the base station is poorly defined or because the base station's coverage area is significantly extended. For example, the location of the base station may be poorly defined because, in a DAS deployment, many antennas are used and placed some distance from each other, which distorts the typical coverage area or footprint of a base station. Similarly, in a repeater deployment, the coverage area may be greatly extended in one specific direction, also distorting the typical coverage area or footprint of a base station.

If a conventional delay-measurement based geolocation system is used to locate a mobile device within a DAS sector, it should be appreciated that inaccuracies may occur because of significant additional delays to the signals, prior to them being transmitted by DAS antennas. This additional delay may trick a conventional (delay-based) geolocation system into thinking that the mobile device is much further from the BTS (or antenna) than is actually the case. Similarly, with a repeater system, the coverage area of a cell or sector, which is based on the donor cell (e.g., the BTS which provides the signals which are received and re-transmitted by the repeater), may be grossly distorted by the repeater, making it difficult to locate mobile devices within the network.

Figure 1:
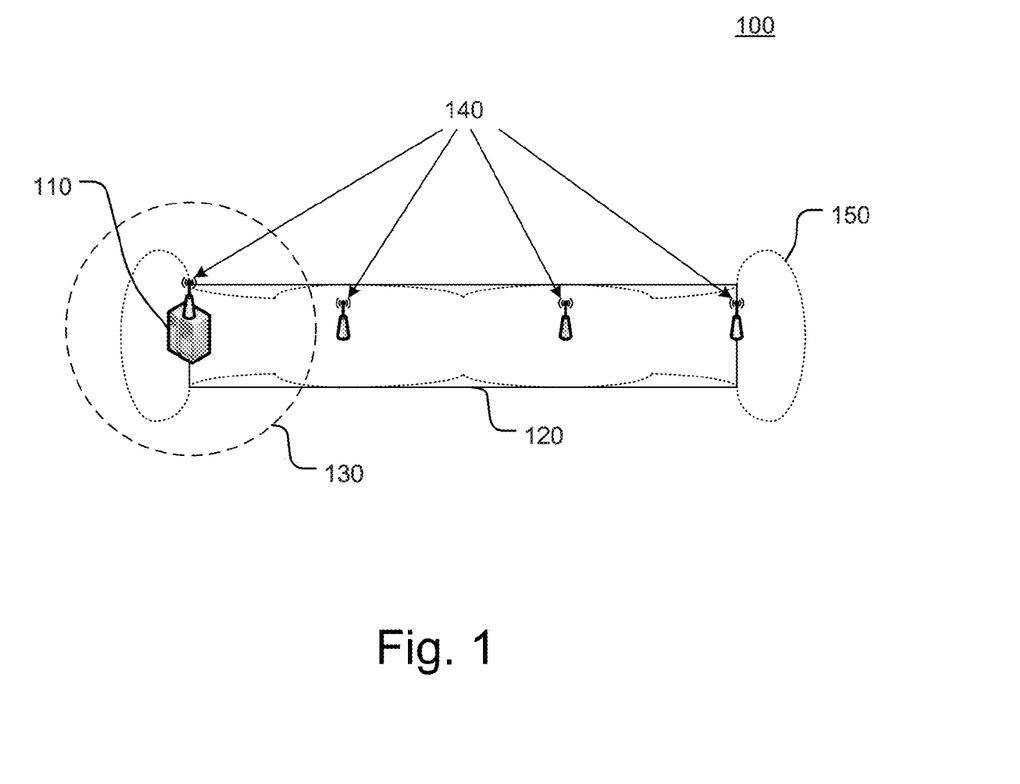
FIG. 1 depicts an estimated coverage area of a base station configuration using a distributed antenna system (DAS), according to an exemplary embodiment.

FIG. 1 depicts an estimated coverage area of a base station configuration using a distributed antenna system (DAS), according to an exemplary embodiment. It should be appreciated that configuration 100 illustrates an operations support system (OSS) reported DAS base transceiver station (BTS) location 110 near a tunnel 120. In terms of geolocation, an operator may treat the OSS-reported BTS 110 as having an expected circular coverage area 130 based on the reported BTS location. The operator may not provide any additional detailed information regarding DAS antenna locations or individual coverage patterns of the DAS or its antennas. However, the expected circular coverage area 130 would be an inaccurate estimate of the coverage area. As discussed above, typical DAS systems rarely fit this circular geometry, and therefore providing such an estimate would be unreliable for locating a mobile device within the network.

Referring to configuration 100 of FIG. 1, there may be several DAS antenna locations 140 spread throughout the tunnel 120. Thus, the actual coverage area 150 of the BTS location with the DAS antennas may not be circular at all, but rather, a unique longitudinal shape that extends through and out of the tunnel 120. In this scenario, it may be possible to leverage knowledge of various coverage areas of adjacent cells in order to refine an initial location estimate. For example, a neighbors list or table for the DAS cell site may be determined. This may be achieved without the neighbors list broadcast by the BTS itself, or by deprioritizing or rearranging the neighbors list from the BTS. By creating its own neighbors list from the neighbors reported by a large sample of mobile devices, which are or have been, at various locations within the DAS cell (and the signal strengths of each neighbor, as reported by the mobile device), a notional map may be constructed. Such a map may place the plurality of mobile devices, depending upon which neighbors are reported as being able to be detected (and how strongly). In this way, location enhancement may be provided to more accurately locate a plurality of mobile devices served by a DAS or repeater-based BTS system. It should be appreciated that this technique may further involve, for example, integrating a timing-based geolocation, a signal-strength contour process, and/or other location techniques. Furthermore, the geolocation of individual mobile devices, located within the DAS or repeater coverage footprint, may be weighted by the observed frequency of measurements associated with the DAS or repeater base-station, by the nearby base stations, in such a way that the geolocation of mobile devices within the DAS cell may be statistically accurate, to ensure that coverage and performance maps may be accurately represented.

There may be several ways to identify a cell/sector as a DAS or repeater cell/sector. In some embodiments, a DAS sector or BTS may be identified as such by a network configuration file made available and obtained from the OSS or a network planning tool/database. In some cases where a DAS sector may not be as readily identifiable, for example, as a result of an error in the network configuration file, there may be other ways to identify the DAS sector.

It should be appreciated that a DAS sector may have associated with it a much larger propagation delay and/or a much longer reported timing advance for signals it transmits and receives. This may be due to the fact that BTS circuitry, which may process digital signals and may create and demodulate RF (radio frequency) signals, may be located some distance from antennas that radiate and receive the RF signals. From an RF propagation perspective, therefore, it is the total distance which the RF signal has to propagate, including propagation along the coaxial cables, fiber optic cables (or similar) to and from the remote antennas and/or through additional amplifier circuitry, that may determine the reported propagation delay or timing advance values. Therefore, an unusually-large propagation delay, as reported by a large number of mobiles connected to that BTS, may be a likely indication that the BTS is, in fact, a DAS system. The reason for requiring a large number of mobile devices to report an unusually large propagation delay, in order to classify a cell or sector as a DAS system, may be to overcome situations where a small number of mobile devices may happen to operate on a periphery of a cell or sector and may therefore report a large propagation delay. With a very large number of reports from a large number of mobile devices, chances that all of the mobile devices happen to be on the edge or periphery of a cell or sector's coverage area (and remain there during all of the reports made by their devices) becomes increasingly small. Moreover, with fiber distributed systems, the observed propagation delay may often be 2 or more times the "expected" maximum propagation delay considering the local average inter-site separation distance in the vicinity of the DAS site.

Identifying a DAS system may begin by examining the propagation delay or timing advance characteristics. This may involve collecting data over time, for a sector, for a large number of mobile devices connected to that sector/BTS. The period of time for collecting data associated with propagation delay or timing advance characteristics may be one week or other predefined duration. If there are few or no instances of a low delay value, then the BTS in question may likely be a DAS sector. For example, if 99.9% of values appear to show a delay corresponding to a relatively long distance from the mobile to the BTS (e.g., >1 km), then the BTS may deploy a DAS system and be identified as such.

It should be appreciated that an area covered by a BTS deploying a repeater may be similarly identified as well. Although a repeater adds delay to RF signals, this delay may not be as reliable to be used as distinguishing factor for the purposes of identifying a repeater system. What may be more useful is that repeaters may be identified by peaks in a delay histogram.

Figure 2:
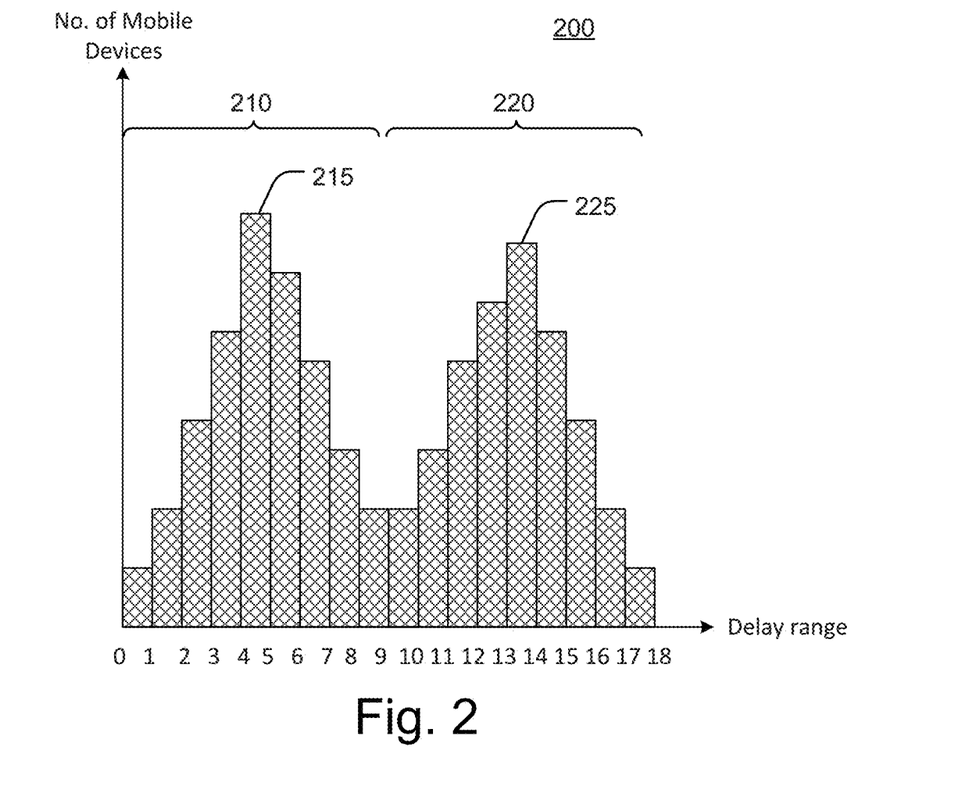
FIG. 2 depicts a histogram for a base station configuration using a repeater system, according to an exemplary embodiment.

FIG. 2 depicts a histogram for a base station configuration using a repeater system, according to an exemplary embodiment. In a repeater system (where a base station is the donor cell for a repeater), the repeater receives signals from the donor cell and re-broadcasts the signals from the donor cell. This is typically done in a specific direction, to cover an area which would otherwise be shadowed, and hence poorly covered (likewise, in the reverse direction, for received signals). A typical example would be a tunnel, as shown in FIG. 1. In a tunnel scenario, a repeater may receive signals from a donor cell located outside of the tunnel and re-broadcast them down the tunnel. The repeater may be located some distance from the donor cell and, due to the signal processing electronics within the repeater, the repeater may add a significant overall delay to the signals which it receives and re-broadcasts (both to and from the donor BTS).

Referring to FIG. 2, there may be shown a first distribution 210 with a distinct "peak" 215 and a second distribution 220 with a distinct "peak" 225 in the histogram 200. Here, the histogram 200 may show, cumulatively, the number of mobile devices that recognize (but may not necessarily be served by) the donor BTS (y-axis), whether directly or via the repeater, and the overall delay values and ranges (x-axis) that are reported. It should be appreciated that delay values may be reported in a variety of different units relevant to mobile communications system. In some embodiments, such values for reporting may be as follows: 1 delay unit=3 "chips" in the transmitted or received data stream. Other various values may also be used. In the histogram 200 of FIG. 2, the horizontal axis (x-axis) may record the delay values and ranges and the height of each histogram bar may represent the number of users/mobile devices within a given time period (e.g., 1 week or other predefined period of time) who report a delay of 0-1 unit, 1-2 units, 2-3 units, etc.

The reason why there are two distributions 210, 220 and two peaks 215, 225 in histogram 200 of FIG. 2, rather than the single peak, which would normally be expected of single BTS, may be explained as follows. A mobile device connected directly to a donor BTS (or seeing the donor BTS) may report a delay value based upon its distance from that BTS. Overall, these delay values may approximate a first "normal" distribution 210. With the right-most extremities of this distribution 210 representing delay values at extremes of the sector's coverage, delay values for mobile devices that are directly connected to the donor BTS may be shown as the left-most histogram bar distribution in FIG. 2. Users served by a repeater may therefore be located at distances from the repeater which would typically also form another (second) normal distribution 220. As noted above, the repeater may be located some distance (~delay) from a donor cell/BTS and may also introduce its own (signal processing) delay. The sum of these two delays (distance and processing) may represent a base delay for all mobile device signals processed by the repeater (e.g., they may represent the left-most parts of the second 'normal' distribution 220). This second normal distribution 220 may be offset from the first normal distribution 210 due to the intrinsic delay of the repeater's signal processing and the delay introduced in getting signals to/from the donor cell. Thus, two distinct histograms may result, where the first peak 215 may correspond to the donor BTS and the second peak 225 to a repeater. Likewise, if further repeaters are daisy-chained from the repeater, additional "normal" distributions (and peaks) may be introduced to the right of the histogram 200 (not shown), due to the further delays introduced in each case where another repeater is added. In this way, it may be possible to identify a sector which is the donor for a repeater, but also the number of repeaters that are being served in the sector.

Once a sector has been identified as a DAS- or repeater-served sector, then the process of establishing its coverage area may then be initiated.

First, a neighbors list for the DAS or repeater sector may be determined. It should be appreciated that this may involve a process of calculation/identification rather than a downloaded configuration file from the OSS or network planning tool. It should be appreciated that determining the neighbors list through the process of calculation/identification may avoid compounding any errors present in a configuration file received from the OSS or other tool/database. The process of calculating the neighbors list for the sector may involve: (1) examining data reported by mobile devices attached to the cell/sector; (2) examining data reported by mobile devices not attached to the cell/sector; (3) repeating (1) and (2) until enough data is acquired to construct a CCDF (complementary cumulative distribution function) of the data; and (4) optionally performing calculations to maximize reliability of the data.

For (1), examining data reported by mobile devices attached to the cell/sector may further involve examining historic data of mobile devices that were connected to the sector at the time the data was transmitted and recorded. In particular, examining data reported by mobile devices attached to the cell/sector may further involve extracting the data concerning which neighboring cells/sectors these user handsets could see at that time or any other time.

For (2), examining data reported by mobile devices which may not be attached to the cell may not exclude examining data reported by mobile device which may still "see" or recognize that cell in their neighbors table (both present and historic data, as above). This data may include the cell/sector to which the mobile device is attached, as this cell/sector may then likely be a neighbor of the DAS cell (since it appears in that mobile device's neighbors table).

For (3), gathering sufficient data from (1) and (2) may be required to construct reliable a CCDF of the data. The CCDF may contain information regarding neighbors which are reported and signal strengths at which these neighbors are reported. This may be helpful for ultimately generating an estimated coverage area without human intervention or other potential errors (e.g., typically found in OSS or other network planning databases, etc.).

For (4), performing calculations to maximize reliability of data may be optional. In some embodiments, one such calculation or action may comprise discarding the bottom 5% of the neighbors with the lowest signal strengths. It should be appreciated that any energy-based measurement would do here, not just signal strength or signal-to-noise ratio. Discarding the bottom 5%, in this scenario, may increase the reliability of the data and remove any potentially-spurious entries (e.g., users who see neighbors far away, due to having climbed a hill).

Second, once a neighbors list for the DAS or repeater sector is determined, a "centroid of coverage" for each neighboring sector may be calculated. It should be appreciated that the "centroid" may or may not be a location of the BTS antenna for that neighbor; however, such a calculation provides an estimated location that may prove sufficiently accurate and reliable for approximating mobile device location.

Figure 3:
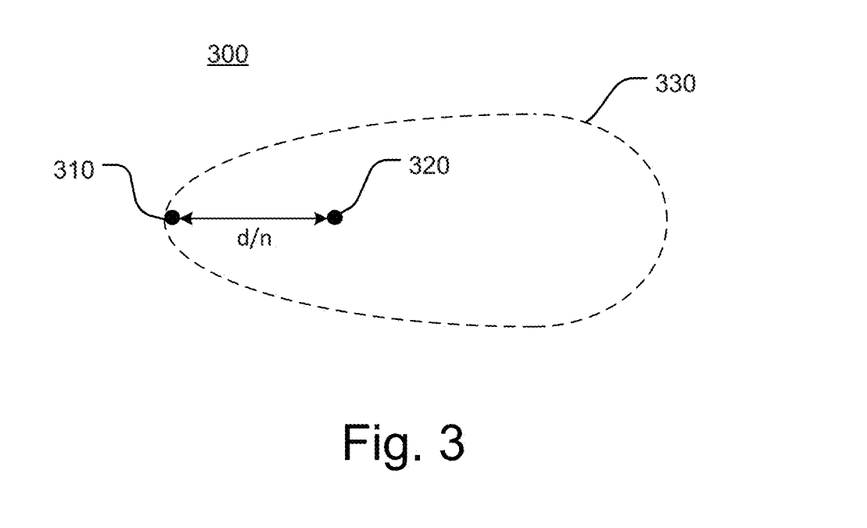
FIG. 3 depicts a centroid of coverage for a base station configuration area for a distributed antenna system (DAS) or a repeater system, according to an exemplary embodiment.

FIG. 3 depicts a centroid of coverage of a sector configuration for a distributed antenna system (DAS) or a repeater system, according to an exemplary embodiment. Referring to FIG. 3, a sector configuration 300 is shown with a published site location of a neighboring site 310, a centroid of coverage 320, and a sector coverage area 330. Here, the centroid of coverage 320 may effectively be a point within the sector coverage area 330 of a sector 300 (which is adjacent to a DAS sector) that provides an approximate position of a notionally omni-directional antenna which may provide (roughly) similar coverage to the actual sector (at least in a direction of the DAS sector). This may be a rough approximation for the location of an antenna, since a real sector would have a wider or perhaps more elongated coverage pattern and perhaps not as circular a coverage pattern. However, the approximation based on calculation of the centroid and its coverage area may be sufficiently reliable.

It should be appreciated that the centroid of coverage may be calculated in several ways. For example, a coverage area for that sector may be predicted by using a position of the base station, together with knowledge of an antenna's azimuth pointing direction and notional Effective Isotropic Radiated Power (EIRP). The centroid of coverage may then be determined to be at a center of that notional coverage area or at a weighted (fractional) point away from the antenna, in the direction of the azimuth antenna direction.

Another way to calculate the centroid of coverage may be to average the site spacing of the nearest sectors to the DAS system (e.g., nearest 8 sectors to the DAS system) and to use a fraction of this site spacing as the distance to place the centroid from the BTS site location, in the azimuth direction of the antenna. For example, referring to FIG. 3, if the average distance between the closest 8 sites is 2d meters (where a notional coverage distance of a given site, on average, then being d meters), a centroid may be determined and placed d/n meters from the published BTS site, in the direction of the azimuth pointing angle of the antenna, where n=2.

It should be appreciated that in a scenario of an omni-directional site, it may not be necessary to calculate a centroid of coverage, since the BTS antenna location would be at the center of the coverage area of the site by definition. So, in this case, the BTS antenna location may be synonymous with the centroid of coverage.

Third, cluster analysis may be applied to centroids of neighboring cells. Various clustering calculations may be applied. These may include, but are not limited to: connectivity based clustering (hierarchical clustering), centroid-based clustering, distribution-based clustering, density-based clustering, or other cluster analysis. This cluster analysis may result in a number of separate, identified clusters, each of which may have a centroid point. The centroid of a cluster may be identified by either taking an average of the locations of the individual sector centroids making up that cluster or by taking an average, which is weighted by one of a number of mechanisms, described in greater detail below. In either case, a single 'cluster centroid' may be identified for each cluster where each of these 'cluster centroids' is then assumed to be an approximate location of an individual DAS antenna for a DAS sector.

Figure 4A:
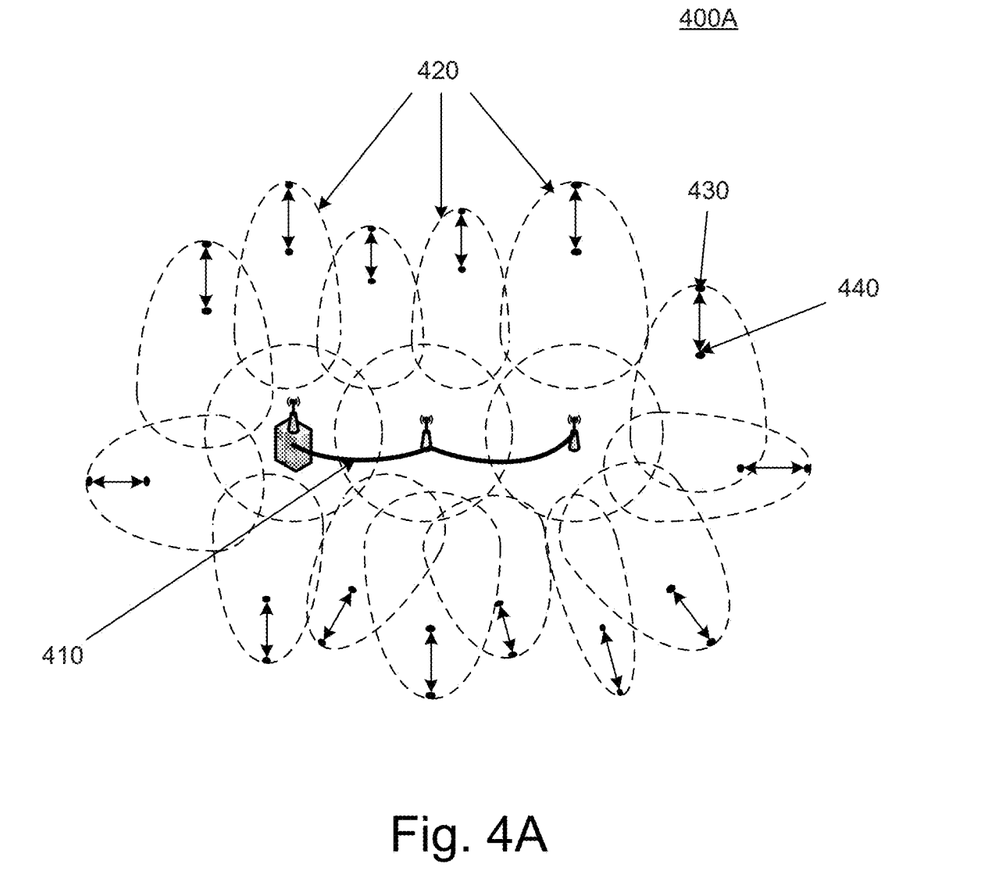
FIGS. 4A-4B depict centroid clustering for estimating a coverage area for a distributed antenna system (DAS) or a repeater system, according to an exemplary embodiment.
Figure 4B:
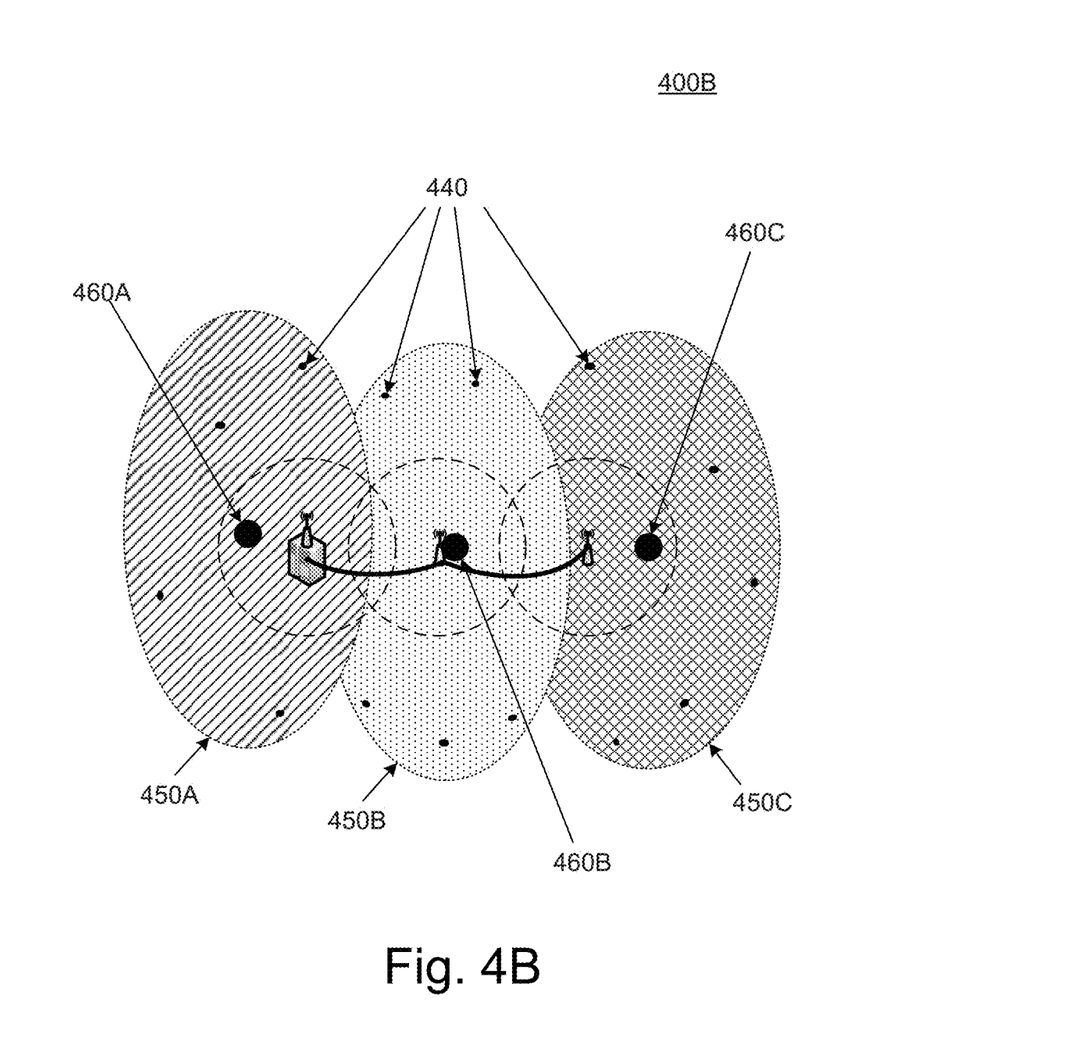

FIGS. 4A-4B depict centroid clustering for estimating a coverage area for a distributed antenna system (DAS) or a repeater system, according to an exemplary embodiment. Referring to FIG. 4A, centroid clustering for sectors surrounding a DAS sector 400A is shown. Specifically, configuration 400A illustrates a DAS sector 410 with cable connection to DAS antennas and many nearby sectors 420, each having a BTS location 430 and a location of centroid of coverage 440.

Referring to FIG. 4B, configuration 400B illustrates the same situation in 400A of FIG. 4A but removes coverage areas for BTS locations of surrounding sectors. Configuration 400B further depicts an illustrative clustering of centroids of surrounding sectors, and in this case, forming three large clusters 450A, 450B, and 450C. Each large cluster may have its own calculated centroid. For example, cluster 450A may have centroid 460A, cluster 450B may have centroid 460B, and cluster 450C may have centroid 460C. Each of these calculated centroids 460A, 460B, 460C may be indicative of an approximate location for a DAS antenna or repeater.

As described above, one or more weighting techniques (or similar analysis) may be used to help determine a centroid location for a cluster. For example, weighting may be based upon a number of neighbor reports over a period of time. Here, each sector within the cluster may generate neighbor reports from a mobile device that recognizes that sector (whether or not it is served by the sector). Some sectors may generate more of these reports than others. This may be a factor of location or design parameters (e.g. coverage area, proximity to a popular area such as a train station etc.). The sectors that generate a larger number of reports may therefore be deemed to be more relevant or important, and therefore the centroid location may be weighted in their favor (e.g., more towards the location of sectors that generate more reports than those that generate less or are less popular or visible).

In addition, weighting may be based upon the total "energy" reportedly received by mobile devices over a period of time. For example, it may be possible to sum up signal strength reports from all of mobile devices that report statistics for that sector over a period of time. This may apply to other similar reports from mobile devices (whether connected to the sector or not), and the period of time may be any time that allows a reasonably reliable set of data to be collected (e.g., 1 week). For example, in an Ec/No report, energy per chip (Ec) may be divided by total received power spectral density in a bandwidth of interest (No). The summation would typically be linear, as reported values may normally be in decibels (dB) and be converted to linear form (using an anti-logarithm) prior to summation. This mechanism, therefore, weights by both (1) "popularity" of the sector where more mobile devices that recognize the sector corresponds to a greater reported "energy" (assuming all other things being equal) and (2) strength of the signals seen by those mobile devices from that sector. Here, the summation of higher signal strengths may lead to a greater reported "energy" than the summation of lower values if the number of users was roughly equal in both cases. Ultimately, these weighting techniques, or other similar mechanisms, may help enhance accuracy in determining centroid location for a cluster, which in turn may help generate a more reliable coverage area estimate for locating mobile devices within a DAS or repeater sector.

Fourth, based upon these predicted antenna locations, it may be possible to construct an approximate coverage map or footprint for the BTS deploying a DAS or repeater system. This coverage footprint may then be used, in turn, in a geolocation system to more accurately geolocate users who are connected to a BTS deploying a DAS or repeater system. It should be appreciated that the geolocation system may perform one or more geolocation techniques in accordance with at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties.

It should be appreciated that the techniques described herein may provide improvement in geolocation accuracy for mobile devices connected to a BTS using DAS or repeaters, relative to conventional circular coverage patterns, which are based upon reported BTS locations.

While embodiments may have focused on DAS, it should be appreciated that techniques described herein may also be applied to sectors in which one or more repeaters are communicatively coupled. Such sectors may have a conventional coverage pattern in most directions but are more likely to have a significantly elongated coverage pattern in one direction (e.g. to cover a tunnel or a specific street).

An advantage of the techniques described herein is that there may be little or no significant downside to misidentifying a normal BTS sector as a DAS sector. If a normal BTS sector (e.g., not deploying a DAS or repeater) is treated as one that is deploying a DAS or repeater, an estimated coverage pattern generation would not be too dissimilar to the actual coverage pattern which would have been assumed. Accordingly, any subsequent geolocation analyses undertaken for users in that sector may yield reasonably accurate results and the overall impact of the misidentifying of a normal BTS as a DAS or repeater based BTS is therefore relatively small or negligible.

It should be appreciated that base stations or BTS, as described herein, may include radio transceivers that define a cell and may coordinate radio-link protocols with mobile devices. A base station may also provide a networking component of a mobile communications system from which signals are sent and received. A base station may be controlled and monitored by one or more Base Station Controllers (BSC) to provide communication over a network. The network may be the Internet or one or more other networks utilized for connecting various network providers and/or clients and allow for mobile communications between various mobile communications devices. As described above, a base station may comprise configuration parameters that control various aspects of a cell site, where each of these parameters may be altered to change network behavior, based on observations of both the base station itself, measurements at the mobile station or handset, or other acquired or generated data. In addition, a base station may include a small cell, such as a femtocell, picocell, microcells, or other device that uses distributed radio technology to enhance network coverage area.

Mobile devices, as described herein, may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile devices 110A-110G may be used independently or may be used as an integrated component in another device and/or system (e.g., an automobile).

It should be appreciated that a base station, as described herein, may be connected to a variety of other backend systems. In order for the systems, configurations, and modules, as described herein, to provide various services to its subscribers, a base station via the BSC may be communicatively coupled to one or more servers which in turn may access a variety of databases. These databases may store a variety of information. For example, the databases may store information that identifies subscribers using its service and for which service features are subscribed. The databases may store information, such as a subscriber's customer name, identification number, services, or other identifiers, and/or whether a user's mobile devices is switched on or off. It should be appreciated that these databases may be highly robust and may further store geolocation information, geolocation-derived information, and other information suitable for estimating a coverage area for a DAS or repeater system.

It should be appreciated that the contents of these databases may be combined into fewer or greater numbers of databases and may be stored on one or more data storage systems and in more than one formats. The data storage systems may be local, remote, or a combination thereof to clients systems, servers, and/or other network components. Information stored in the databases may be useful in, for example, estimating a coverage area for a DAS or repeater system, locating a mobile device within such coverage area, and/or other related services.

Communication between the various base stations, mobile devices, service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

By estimating a coverage area for a distributed antenna system (DAS) or a repeater system, a more reliable way to geolocate mobile devices within such systems may be achieved.

Figure 5:
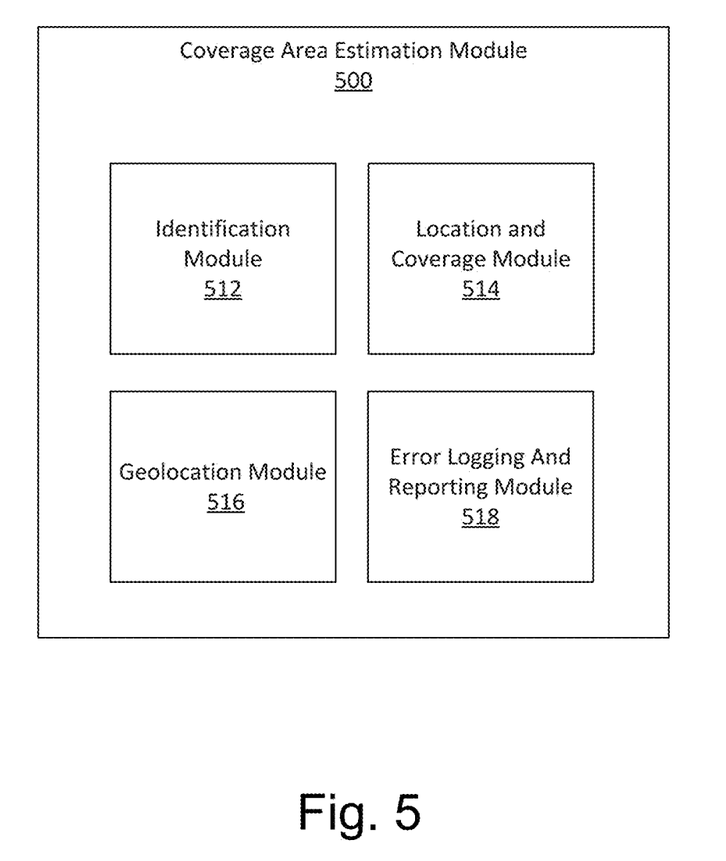
FIG. 5 depicts a coverage area estimation module for estimating a coverage area for a distributed antenna system (DAS) or a repeater system, according to an exemplary embodiment.

FIG. 5 depicts a coverage area estimation module for estimating a coverage area for a distributed antenna system (DAS) or a repeater system, according to an exemplary embodiment. Referring to FIG. 5, there is shown a coverage area estimation module 510 in accordance with an embodiment of the present disclosure. As illustrated, the coverage area estimation module 510 may contain one or more components including identification module 512, location and coverage module 514, geolocation module 516, and error logging and reporting module 518.

The description below describes network elements, computers, and/or components of a system and method for estimating a coverage area for a DAS or repeater system that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Identification module 512 may identify a sector as being a base station sector that deploys a distributed antenna system (DAS) or a repeater system. In some embodiments, this may be achieved by using a network database or other database or source. Various other techniques may be used, as described herein, to determine whether a base station sector deploys a distributed antenna system (DAS) or a repeater system.

Location and coverage module 514 may determine an approximate location for one or more antennas deployed by the distributed antenna system (DAS) or the repeater system. Location and coverage module 514 may also help to construct an estimated coverage area for the base station sector that deploys the distributed antenna system (DAS) or the repeater system.

Geolocation module 516 may be used to determine geolocation or geolocation-derived data associated with a mobile device. For example, as discussed herein, the geolocation module 512 may be used to receive information from a mobile device associated with geolocation, such as speed, direction of movement, etc., and may also use that information to calculate and determine where the mobile device is traveling so that this information could be further processed to provide an approximate location of one or more mobile devices within the estimated coverage area.

Error logging and reporting module 518 may produce logs, reports, or other information associated with estimating a coverage area for a distributed antenna system (DAS) or a repeater system. It should be appreciated that any or all of these modules 510-518 may be communicatively coupled to one or more databases or storage/memory units (not shown), locally or remotely, so that information may be stored for later use or processing.

Figure 6:
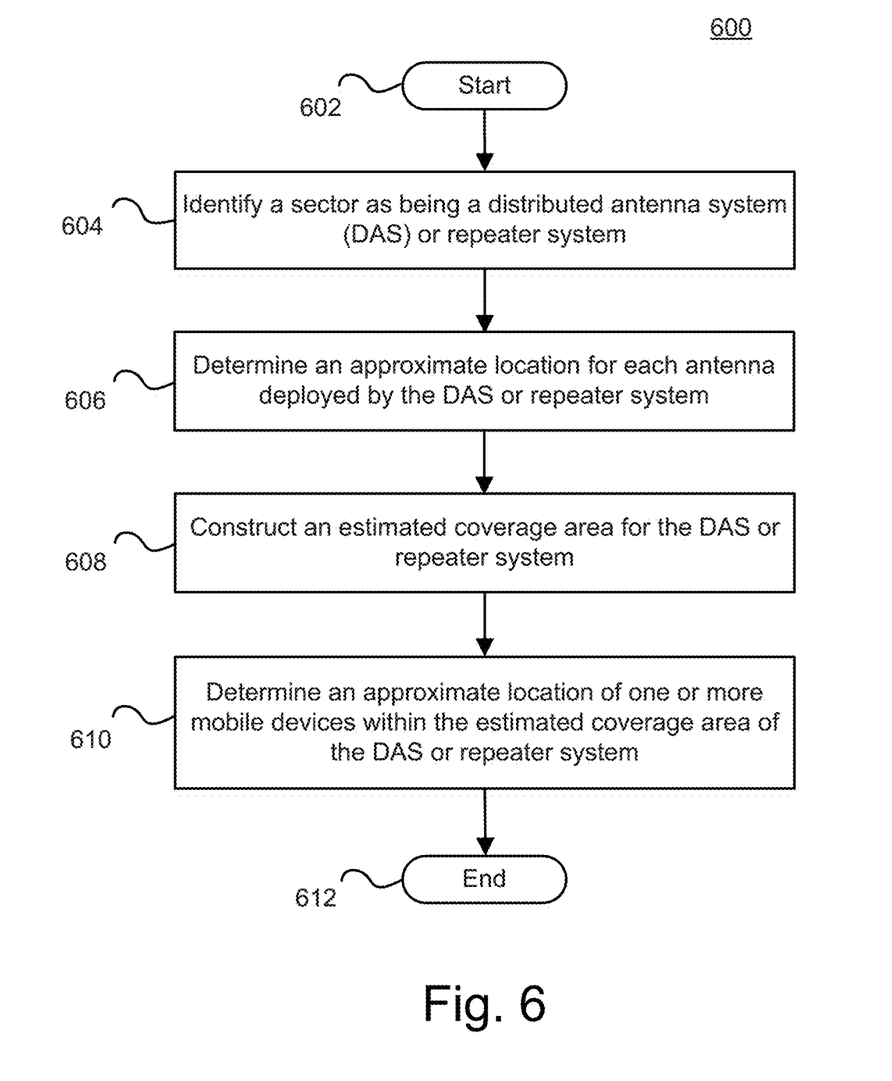
FIG. 6 depicts a flowchart of a method for estimating a coverage area for a distributed antenna system (DAS) or a repeater system, according to an exemplary embodiment.

FIG. 6 depicts a flowchart of a method for estimating a coverage area for a distributed antenna system (DAS) or a repeater system, according to an exemplary embodiment. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by at least the systems, configurations, diagrams, schematics, and modules in FIGS. 1-5, by way of example, and various elements of module 500 are referenced in explaining the exemplary method of FIG. 6. Each block shown in FIG. 6 represents one or more processes, methods, or subroutines carried out in the exemplary method 600. A non-transitory computer-readable medium comprising code, which when performed by a computer may perform the acts of the method 600 may also be provided. Referring to FIG. 6, the exemplary method 600 may begin at block 602.

At block 604, a sector may be identified as being a base station sector that deploys a distributed antenna system (DAS) or a repeater system. For example, this may be achieved using the identification module 512 of the coverage area estimation module 510. In some embodiments, identifying a sector as being a base station sector that deploys a distributed antenna system (DAS) or a repeater system may be based on information received from a network database or other database or source. In some embodiments, when the sector is an unknown sector, identifying the unknown sector as a base station sector that deploys the DAS may comprise: collecting data associated with propagation delay or timing advance characteristics over a period of time for a plurality of mobile devices connected to the unknown sector, wherein values for propagation delay or timing advance characteristics may correspond to a physical distance; examining the collection of data to identify the values for the propagation delay or timing advance characteristics; and determining that the unknown sector is a base station that deploys the DAS when the values for propagation delay or timing advance characteristics meet or exceed a predetermined threshold value.

In some embodiments, when the sector is an unknown sector, identifying the unknown sector as a base station that deploys a repeater system may comprise: identifying a number of mobile devices that recognize a donor base station; collecting overall delay values for signals transmitted to and from each mobile device and the donor base station, wherein the overall delay values correspond to a distance between each mobile device and the donor base station; analyzing the distribution of overall delay values experienced by a number of mobile devices; and determining, in the event a plurality of peaks is identified in the distribution, that the sector is a base station sector that deploys a repeater system. It should be appreciated the plurality of peaks may comprise a first peak and one or more additional peaks. Here, the first peak may represent the donor base station and each of the one or more additional peaks may represent one or more repeaters.

At block 606, an approximate location for one or more antennas deployed by the distributed antenna system (DAS) or the repeater system may be determined. For example, this may be achieved using the location and coverage area module 514 of the coverage area estimation module 510.

At block 608, an estimated coverage area may be constructed for the base station sector that deploys the distributed antenna system (DAS) or the repeater system. For example, this may be achieved using the location and coverage area module 514 of the coverage area estimation module 510. In some embodiments, constructing an estimated coverage area for the base station sector that deploys the distributed antenna system (DAS) or the repeater system may comprise: determining a neighbors list for the base station sector that deploys the distributed antenna system (DAS) or the repeater system; calculating a centroid of coverage for each sector neighboring the base station sector that deploys the distributed antenna system (DAS) or the repeater system; and applying cluster analysis on the centroid of coverage to approximate locations of one or more antennas of the DAS or one or more repeaters of the repeater system.

In some embodiments, determining the neighbors list may comprise: examining data reported by a plurality of mobile devices, wherein the data comprises current and historic information associated with neighboring sectors of the base station sector; and constructing a complementary cumulative distribution function (CCDF) based on the examined data.

It should be appreciated that, in some embodiments, calculating a centroid of coverage may comprise: predicting a notional coverage area by using a position of the base station and an identified antenna's azimuth pointing direction and notional Effective Isotropic Radiated Power (EIRP); and determining the centroid of coverage at a center of the notional coverage area or at a weighted (fractional) point away from the antenna, in the direction of the azimuth antenna's pointing direction. In some embodiments, calculating a centroid of coverage may comprise: averaging site spacing of some or all sectors nearest to the DAS or repeater system; and determining the centroid of coverage using a distance from the base station, based upon a fraction of the site spacing, in an azimuth pointing direction of the antenna.

It should be appreciated that one or more cluster analysis techniques may be used as well. These may include, for example, connectivity based clustering, hierarchical clustering, centroid-based clustering, distribution-based clustering, density-based clustering.

At block 610, an approximate location of one or more mobile devices within the estimated coverage area of the base station sector that deploys the distributed antenna system (DAS) or the repeater system may be determined. For example, this may be achieved using the geolocation module 516 of the coverage area estimation module 510. In some embodiments, determining the approximate location may comprise geolocating the one or more mobile devices within the estimated coverage area, in accordance with one or more geolocation techniques described herein. In some embodiments, the determined approximate location may be weighted based on frequency of observations of the base station sector by mobile devices associated with neighboring cells.

In addition to the benefits described above, embodiments of the system and method for estimating a coverage area for a DAS or repeater system not only provide an effective and improved technique for locating mobile devices in such systems, but also may allow service providers the ability to provide better service to a larger subscriber pool. Moreover, advantages in network optimization may also be apparent. Providing such a technique for estimating a coverage area for a DAS or repeater system may maximize network resource allocation if the locations of mobile devices are more accurately tracked. Furthermore, advertisement and marketing opportunities may also be available. With knowledge of a user's location, more relevant advertisements and other commercial information may also be presented to one or more subscribers.

While the features and functionalities for estimating a coverage area for a DAS or repeater system are primarily discussed with respect to the embodiments above, it should be appreciated that the features and functionalities of one embodiment may be similarly applied to other embodiments. Furthermore, although the embodiments described above do not require use of GPS technology or other location services, it may be readily appreciated that the features and functionalities described herein may be used in conjunction with such technologies as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that estimating a coverage area for a DAS or repeater system in accordance with the present disclosure as described above typically involves the processing of input data and the generation of output data to some extent. This input data processing and output data generation may be implemented in hardware or software. For example, specific electronic components may be employed in a coverage area estimation module or similar or related circuitry for implementing the functions associated with estimating a coverage area for a DAS or repeater system in accordance with embodiments described above. Alternatively, one or more processors operating in accordance with instructions may implement the functions associated with estimating a coverage area for a DAS or repeater system in accordance with embodiments as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
    collecting, by one or more devices, data associated with propagation delay or timing advance characteristics over a period of time for a plurality of mobile devices connected to an unknown sector;
    examining, by the one or more devices, the data to identify one or more values for the propagation delay or timing advance characteristics;
    determining, by the one or more devices, that the unknown sector is a base station sector that deploys a distributed antenna system (DAS) when the one or more values for the propagation delay or timing advance characteristics satisfy a threshold value;
    determining, by the one or more devices, an approximate location for one or more antennas deployed by the distributed antenna system (DAS); and
    constructing, by the one or more devices and based on determining the approximate location for the one or more antennas, an estimated coverage area for the base station sector that deploys the distributed antenna system (DAS).

2. The method of claim 1, further comprising:
    determining an approximate location of one or more mobile devices within the estimated coverage area of the base station sector that deploys the distributed antenna system (DAS).

3. The method of claim 2, wherein determining the approximate location of the one or more mobile devices comprises geolocating the one or more mobile devices within the estimated coverage area.

4. The method of claim 1, wherein identifying the unknown sector as being the base station sector that deploys the distributed antenna system (DAS) is further based on information received from a network database.

5. The method of claim 1, wherein constructing the estimated coverage area for the base station sector that deploys the distributed antenna system (DAS) comprises:
    determining a neighbors list for the base station sector that deploys the distributed antenna system (DAS);
    calculating a centroid of coverage for each sector neighboring the base station sector that deploys the distributed antenna system (DAS); and
    constructing the estimated coverage area by applying a cluster analysis on the centroid of coverage to approximate locations of one or more antennas of the distributed antenna system (DAS).

6. The method of claim 5, wherein determining the neighbors list comprises:
    examining data reported by a plurality of mobile devices, the data reported by the plurality of mobile devices comprising current and historic information associated with neighboring sectors of the base station sector; and
    constructing a complementary cumulative distribution function (CCDF) based on examining the data.

7. The method of claim 5, wherein calculating the centroid of coverage comprises:
    predicting a notional coverage area by using a position of the base station sector; and
    determining the centroid of coverage at a center of the notional coverage area.

8. The method of claim 5, wherein calculating the centroid of coverage comprises:
   averaging site spacing of some or all sectors nearest to the distributed antenna system (DAS) or repeater system; and
   determining the centroid of coverage using a distance from the base station sector based on a fraction of the site spacing.

9. The method of claim 5, wherein the cluster analysis comprises at least one of connectivity-based clustering, hierarchical clustering, centroid-based clustering, distribution-based clustering, or density-based clustering.

10. A non-transitory computer-readable storage medium storing instructions, the instructions comprising:
   one or more instructions that, when executed by at least one computer processor, cause the at least one computer processor to:
      identify mobile devices that recognize a donor base station;
      collect overall delay values for signals transmitted between the mobile devices and the donor base station,
         each overall delay value, of the overall delay values, corresponding to respective distance between the mobile devices and the donor base station;
      determine a distribution of the overall delay values;
      identify a plurality of peaks in the distribution of the overall delay values;
      determine, based on identifying the plurality of peaks, that an unknown sector is a base station sector that deploys a repeater system; and
      construct an estimated coverage area for the base station sector that deploys the repeater system.

11. The non-transitory computer-readable storage medium of claim 10,
   wherein the plurality of peaks comprise a first peak and one or more additional peaks,
   wherein the first peak represents the donor base station, and
   wherein the one or more additional peaks represent one or more repeaters of the repeater system.

12. The non-transitory computer-readable storage medium of claim 10, wherein the one or more instructions to construct the estimated coverage area comprise:
   one or more instructions that, when executed by the at least one computer processor, cause the at least one computer processor to:
      calculate a centroid of coverage for a sector neighboring the base station sector that deploys the repeater system; and
      construct the estimated coverage area by applying cluster analysis on the centroid of coverage to approximate locations of one or more repeaters of the repeater system.

13. The non-transitory computer-readable storage medium of claim 12, wherein the one or more instructions to calculate the centroid of coverage comprise:
   one or more instructions that, when executed by the at least one computer processor, cause the at least one computer processor to:
      determine a position of the base station sector;
      determine a notional coverage area based on the position of the base station sector; and
      determine the centroid of coverage based on the notional coverage area.

14. The non-transitory computer-readable storage medium of claim 12, wherein the one or more instructions to calculate the centroid of coverage comprise:
   one or more instructions that, when executed by the at least one computer processor, cause the at least one computer processor to:
      determine a neighbors list for the base station sector that deploys the repeater system; and
      calculate the centroid of coverage based on the neighbors list.

15. The non-transitory computer-readable storage medium of claim 10, wherein the instructions further comprise:
   one or more instructions that, when executed by the at least one computer processor, cause the at least one computer processor to:
      determine an approximate location of one or more of the mobile devices within the estimated coverage area.

16. A system comprising:
   at least one processor configured to:
      identify a sector as being a base station sector that deploys a distributed antenna system (DAS) or a repeater system;
      construct a complementary cumulative distribution function (CCDF) based on data associated with another sector that neighbors the base station sector;
      calculate, based on the CCDF, a centroid of coverage for the other sector that neighbors the base station sector;
      analyze the centroid of coverage to approximate one or more locations of one or more antennas of the distributed antenna system (DAS) or the repeater system; and
      construct, based on approximating the one or more locations of the one or more antennas, an estimated coverage area for the base station sector.

17. The system of claim 16, where the at least one processor is further configured to:
   determine an approximate location of one or more mobile devices within the estimated coverage area of the base station sector by geolocating the one or more mobile devices within the estimated coverage area.

18. The system of claim 17, wherein the approximate location of the one or more mobile devices within the estimated coverage area is weighted by a frequency of observations of the base station sector by mobile devices associated with neighboring cells.

19. The system of claim 16, wherein identifying the sector as being the base station sector is based on information received from a network database.

20. The system of claim 16,
   wherein the sector is an unknown sector, and
   wherein, when identifying the sector as the base station sector, the at least one processor is configured to:
      collect data associated with propagation delay or timing advance characteristics over a period of time for a plurality of mobile devices connected to the unknown sector;
      examine the data to identify values for the propagation delay or timing advance characteristics; and
      determining that the unknown sector is the base station sector that deploys the DAS when the values for the propagation delay or timing advance characteristics meet or exceed a threshold value.

21. The system of claim 16,
   wherein the sector is an unknown sector,
   wherein, when identifying the sector as the base station sector, the at least one processor is configured to:
      identify mobile devices that recognize a donor base station;
      collect overall delay values for signals transmitted to and from the mobile devices and the donor base station, each overall delay value, of the overall delay values, corresponding to respective distance between the mobile devices and the donor base station;

determine a distribution of the overall delay values; and determine, based on a plurality of peaks in the distribution, that the sector is the base station sector, wherein the plurality of peaks comprise a first peak and one or more additional peaks, wherein the first peak represents the donor base station, and wherein each of the one or more additional peaks represents a repeater.

22. The system of claim 16, wherein data is reported by a plurality of mobile devices, and wherein the data comprises current information and historic information associated with the other sector that neighbors the base station sector.

23. The system of claim 16, wherein, when calculating the centroid of coverage, the at least one processor is configured to:

determine a notional coverage area by using a position of the base station sector; and determine the centroid of coverage at a center of the notional coverage area.

24. The system of claim 16, wherein, when calculating the centroid of coverage, the at least one processor is configured to:

determine a site spacing of some or all sectors nearest to the distributed antenna system (DAS) or the repeater system; and determine the centroid of coverage using a distance from the base station sector based on a fraction of the site spacing.

25. The system of claim 16, wherein, when analyzing the centroid coverage, the at least one processor is configured to perform at least one of connectivity-based clustering, hierarchical clustering, centroid-based clustering, distribution-based clustering, or density-based clustering.

* * * * *